United States Patent [19]

Kersting

[11] Patent Number: 4,998,904

[45] Date of Patent: Mar. 12, 1991

[54] HARVESTER THRESHER

[75] Inventor: Hermann Kersting, Oelde-Lette, Fed. Rep. of Germany

[73] Assignee: Claas OHG, Harsewinkel, Fed. Rep. of Germany

[21] Appl. No.: 340,557

[22] Filed: Apr. 18, 1989

[30] Foreign Application Priority Data

Apr. 26, 1988 [DE] Fed. Rep. of Germany ....... 3814036

[51] Int. Cl.$^5$ .................... A01F 12/10; A01F 12/385
[52] U.S. Cl. ........................................ 460/70; 460/69; 460/93; 460/114
[58] Field of Search .................... 460/111, 114, 9, 10, 460/69, 85, 70, 63, 77, 93, 90

[56] References Cited

U.S. PATENT DOCUMENTS

| 792,795 | 6/1905 | Schauer | 460/13 X |
| 1,172,011 | 2/1916 | Cooper | 460/13 |
| 3,412,735 | 11/1968 | Bichel et al. | 460/10 |
| 4,606,356 | 8/1986 | Odahara | 460/85 X |

Primary Examiner—Stephen J. Novosad
Attorney, Agent, or Firm—Michael J. Striker

[57] ABSTRACT

A harvester thresher comprises a housing threshing device accommodated in the housing, a plurality of straw shakers located after the threshing device and having a discharge end, threshing and separating device located after the straw shakers, and device for transferring an agricultural product from the straw shakers to the threshing and separating device and including a transferring element fixedly connected with the discharge of each of the shakers for transferring the agricultural product from each of the shakers to the threshing and separating device, and a transfer bottom associated with each of the transferring elements.

13 Claims, 3 Drawing Sheets

HARVESTER THRESHER

BACKGROUND OF THE INVENTION

The present invention relates to a harvester thresher.

More particularly, it relates to a harvester thresher which has a chassis, a housing, a threshing mechanism accommodated in the housing, a plurality of straw shakers located after the threshing mechanism and associated with a return flow bottom and a sieve device, and a threshing and separating device located thereafter.

Such harvester threshers operate in a satisfactory manner. Practical experiments have shown however that under certain conditions, for example in the event of very moist agricultural products, the uniform product transfer is not always guaranteed and residual grains remain especially in the regions with high mat thickness.

SUMMARY OF THE INVENTION

Accordingly, it is an object of the present invention to provide a harvester thresher which avoids the disadvantages of the prior art.

More particularly, it is an object of the present invention to provide a harvester thresher which on the one hand tears the straw mat for optimal residual grain separation prior to introduction into the threshing and separating device, and on the other hand reliably transfers the products to the threshing and separating device.

In keeping with these objects and with others which will become apparent hereinafter, one feature of the present invention resides, briefly stated, in a harvester thresher in which a transferring element is provided at a discharge on each of the shakers for transferring the agricultural product from the shakers to the threshing and separating device, and a transfer bottom is associated with each of the transferring elements.

When the harvester thresher is designed in accordance with these features it achieves the above-specified objects.

In accordance with another feature of the present invention, each transferring element is composed of a plurality of sheets which are arranged parallel to and at a distance from one another, and in the region of their lower ends extend through slots provided in the transfer bottom.

The transferring elements at their end sides which face toward the threshing and separating device, can be provided with a plurality of teeth which are arranged locally, or in other words in some regions.

The transferring bottom borders with the housing of the harvester thresher in a transition-free manner and is connected with the housing.

The transfer bottom in its discharge region as considered in the flow direction is provided with a plurality of perforations behind the above mentioned guiding slots.

The sheets of the transferring elements can be connected with one another by a holder which is screwed to a respective shaker.

The sheets are dimensioned so that they extend downwardly below the associated shakers.

For mounting the sheets on the shakers they are provided with throughgoing openings which are in alignment with openings formed in the shakers.

Finally, the transferring elements are associated with an introduction drum which is located above the discharge end of the shakers before the threshing and separating device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
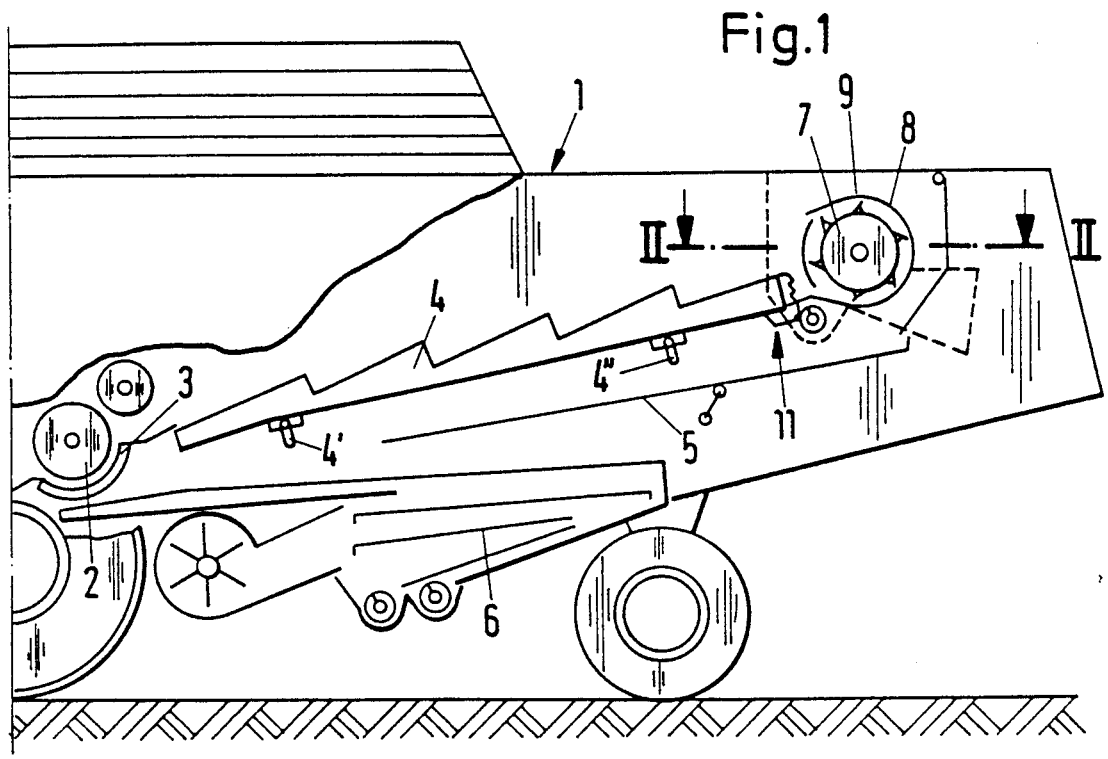
FIG. 1 is a partial side view of a harvester thresher in accordance with the present invention.
Figure 2:
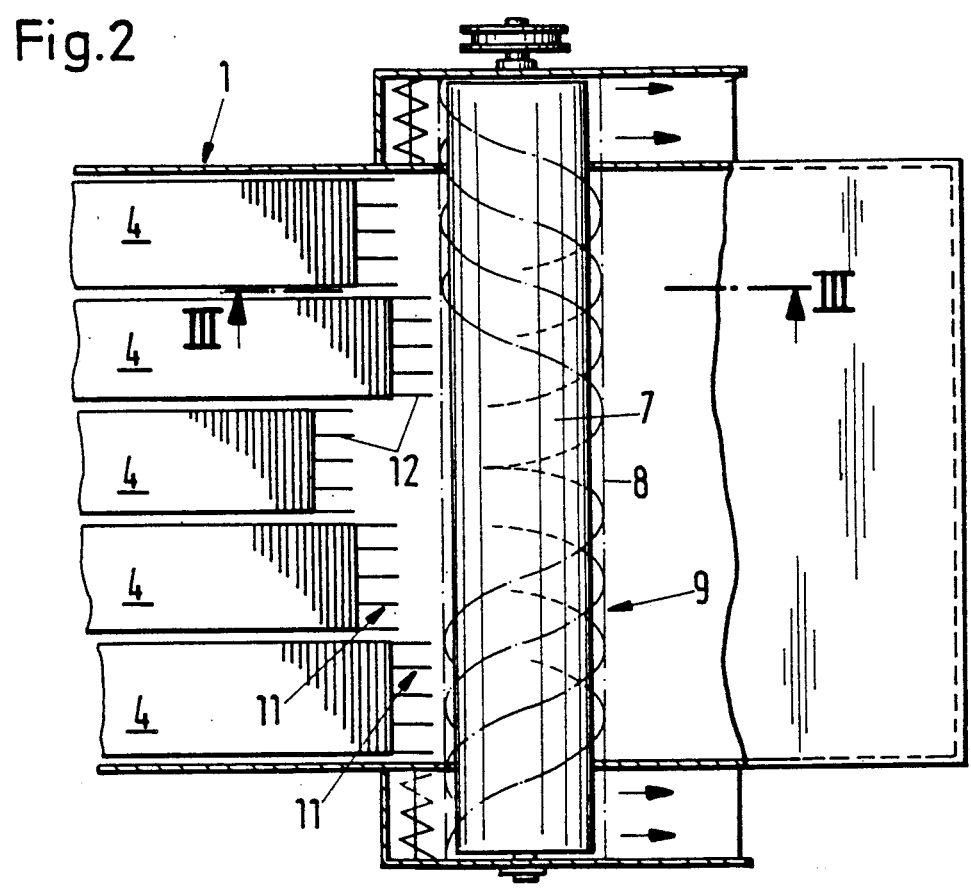
FIG. 2 is a view showing a section taken along the line II—II in FIG. 1.

A harvester thresher has a housing which is identified as a whole with reference numeral 1. The housing accommodates a threshing mechanism which operates in accordance with a tangential flow principle and includes a threshing drum 2 and a threshing basket 3. Straw shakers 4 are arranged after the threshing mechanism, and then a return flow bottom 5 and a sieve device 6 are provided. The shakers 4 are rotatably supported on crank shafts 4' and 4''. Then a threshing and separating device 9 follows, which includes a rotor 7 and a housing 8. The straw shakers 4 end before a product inlet opening 10 of the axial threshing and separating device 9.

Sheets 12 of one transfer element 11 provided with teeth 13 are connected with one another by a sheet form plate or holder 14, for example by point welding 15.

A shaker bottom 18 is provided with a plurality of openings 17. In turn, the sheet form plate 14 in the region of its lower end has thoroughgoing openings 16 which are in alignment with the openings 17. Thereby the sheet form plate 14 can be connected with the bottom 18 by means of not shown screws. This connection is not sufficient for reliably connecting the element 11 with the shaker 4. Therefore, a further screw connection in the rear edge region of a shaker cover 12 is required.

The upper part of the individual sheets 12 has locally bent abutment surfaces 27 provided with opening 19. The shaker cover in turn has openings 22 which are in alignment with the openings 19 of the individual sheets 12. Both outer sheets 12a and 12b have projections 28 provided with openings 29. In mounted condition they coincide with openings 30 in vertically extending shaker side walls 21.

Figure 3:
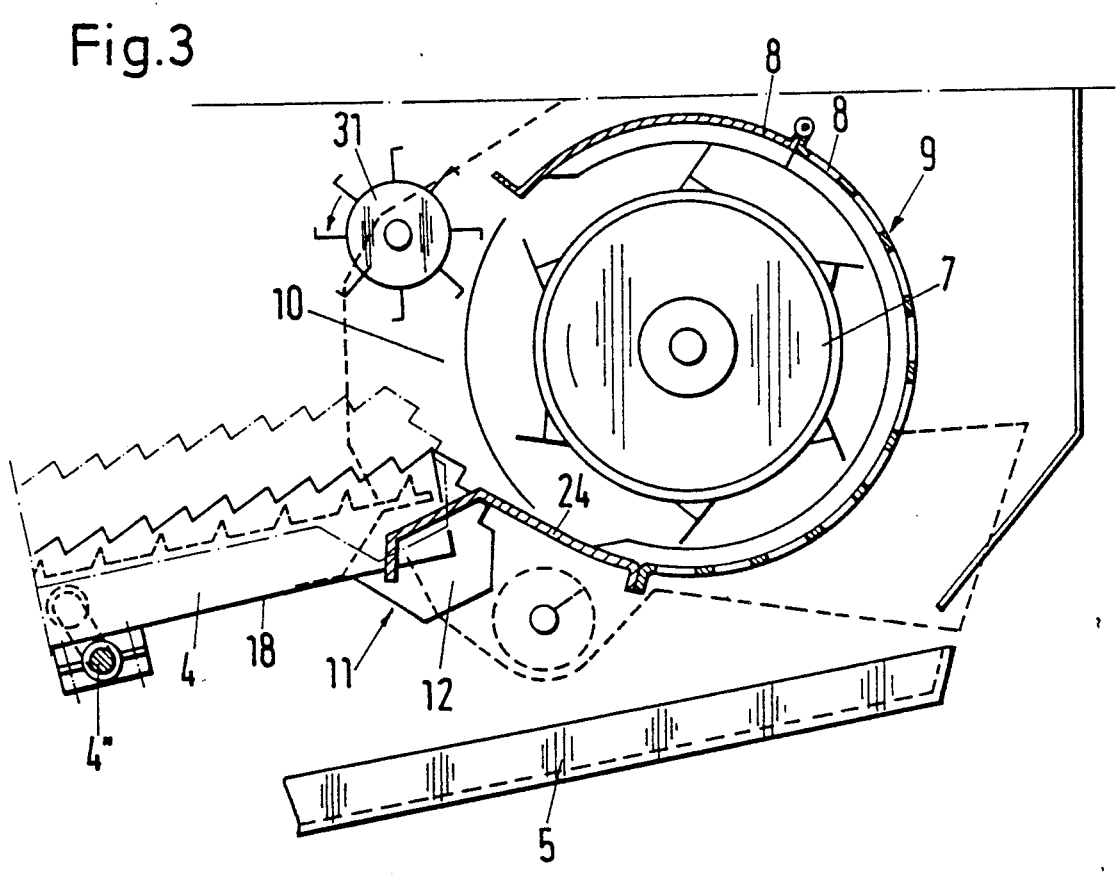
FIG. 3 is a view showing a section taken along the line III—III in FIG. 2.
Figure 4:
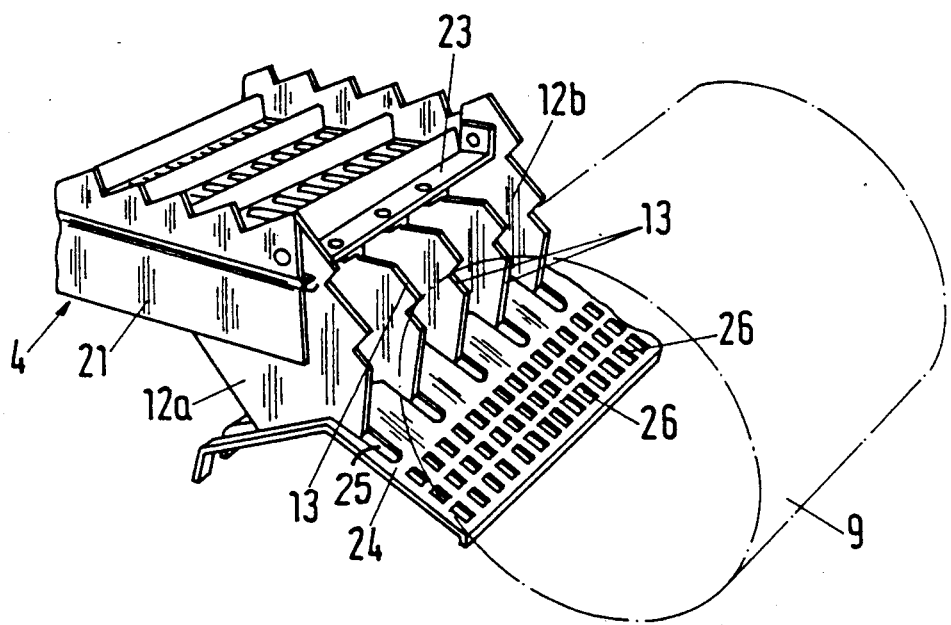
FIG. 4 is a perspective view showing some parts of the inventive harvester thresher.
Figure 5:
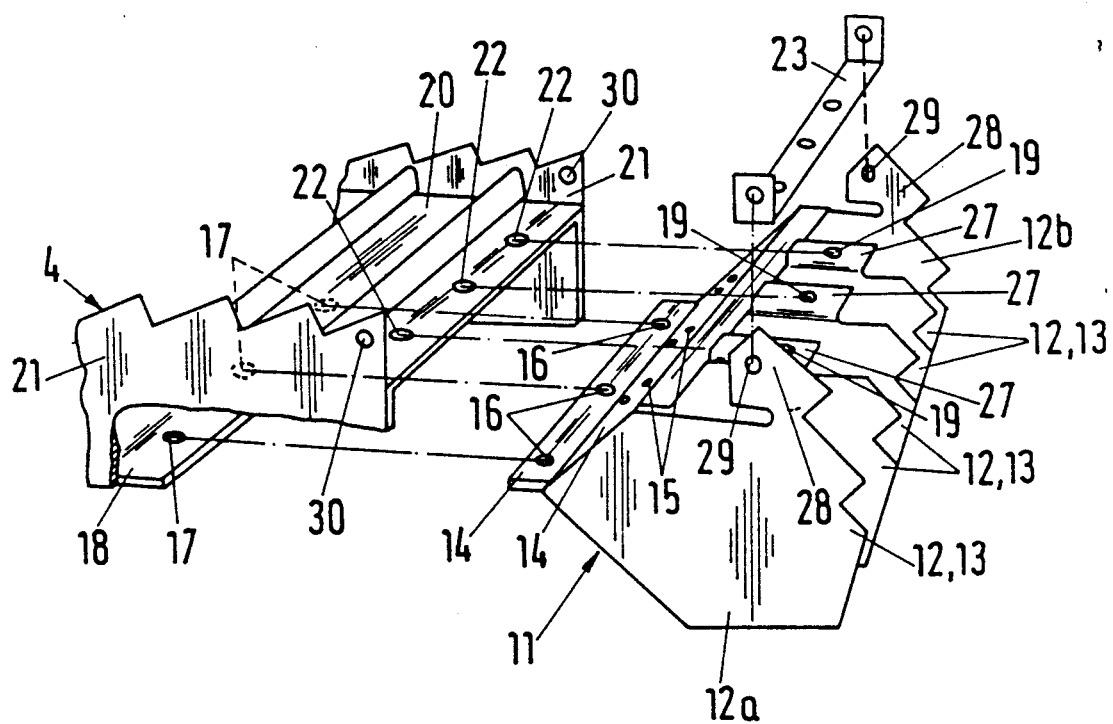
FIG. 5 is an exploded view of the parts shown in FIG. 4.

Additional transverse stabilization is achieved by a band strip 23. The band strip is perforated and bent at its ends. It is connected by means of screws. As can be seen from FIGS. 3 and 4, the housing 8 of the threshing and separating device 9 in the region of the product inlet opening 10 has a transfer bottom 24 provided with slots 25. The sheets 12 of all transfer elements 11 extend downwardly through the slots 25.

In this manner the sheets 12 are guided on the one hand, and the product is stripped in direction of the threshing and separating device. The transfer bottom 24 has throughgoing openings 26 at the end of the slots 25 as considered in the product flow direction. The openings 26 serve for obtaining a residual grain separation during the product transfer.

It has been shown from experiments that the above described transfer elements on the one hand tear the straw mat transported over the shakers, and on the other hand transfer the straw by the individual elements in a positive manner to the threshing and separating device. Thereby a satisfactory residual grain separation and a jam free transfer of the agricultural product is achieved.

It will be understood that each of the elements described above, or two or more together, may also find a useful application in other types of constructions differing from the types described above.

While the invention has been illustrated and described as embodied in a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising a housing; threshing means accommodated in said housing; a plurality of straw shakers located after said threshing means and having a discharge end; threshing and separating device located after said straw shakers; and means for transferring an agricultural product from said straw shakers to said threshing and separating device and including a transferring element fixedly connected with said discharge end of each of said shakers for transferring the agricultural product from each of said shakers to said threshing and separating device, and a transfer bottom associated with each of said transferring elements.

2. A harvester thresher as defined in claim 1, wherein said threshing means is operative in accordance with a tangential flow principle and includes a threshing drum and a threshing basket associated therewith.

3. A harvester thresher as defined in claim 1, and further comprising a return flow bottom arranged under said straw shakers, and a sieve device.

4. A harvester thresher as defined in claim 1, wherein said threshing and separating device is operative in accordance with an axial flow principle and includes a rotor and a housing associated with said rotor.

5. A harvester thresher as defined in claim 1, wherein said transfer bottom borders with said housing in a transition-free manner and is connected with said housing.

6. A harvester thresher, comprising a housing; threshing means accommodated in said housing; a plurality of straw shakers located after said threshing means and having a discharge end; threshing and separating device located after said straw shakers; and means for transferring an agricultural product from said straw shakers to said threshing and separating device and including a transferring element fixedly connected with said discharge end of each of said shakers for transferring the agricultural product from each of said shakers to said threshing and separating device, and a transfer bottom associated with each of said transferring elements, each of said transferring elements including a plurality of sheets arranged parallel to and at a distance from one another.

7. A harvester thresher as defined in claim 6, wherein each of said transfer bottoms has a plurality of slots, said sheets of each of said transferring elements have ends facing toward the ground which are guided in said slots in a standing position.

8. A harvester thresher as defined in claim 7, wherein said transfer bottom has a discharge region as considered in the flow direction and is provided in said discharge region behind said slots with a plurality of perforations.

9. A harvester thresher as defined in claim 7; and further comprising a holder connected with said shakers, said sheets of each of said transferring elements being connected with one another through said holder.

10. A harvester thresher as defined in claim 7, wherein said sheets have such a size that they extend substantially downwardly beyond associated ones of said shakers.

11. A harvester thresher as defined in claim 7; and further comprising means for mounting said sheets on said shakers and including a plurality of openings provided on said shakers and a plurality of throughgoing openings provided on said means for mounting said sheets and aligning with said openings of said shakers.

12. A harvester thresher, comprising a housing; threshing means accommodated in said housing; a plurality of straw shakers located after said threshing means and having a discharge end; threshing and separating device located after said straw shakers; and means for transferring an agricultural product from said straw shakers to said threshing and separating device and including a transferring element fixedly connected with said discharge end of each of said shakers for transferring the agricultural product from each of said shakers to said threshing and separating device, and a transfer bottom associated with each of said transferring elements, said transferring elements having end sides which face toward said threshing and separating device and are provided locally with teeth.

13. A harvester thresher, comprising a housing; threshing means accommodated in said housing; a plurality of straw shakers located after said threshing means and having a discharge end; threshing and separating device located after said straw shakers; means for transferring an agricultural product from said straw shakers to said threshing and separating device and including a transferring element fixedly connected with said discharge end of each of said shakers for transferring the agricultural product form each of said shakers to said threshing and separating device, and a transfer bottom associated with each of said transferring elements; and an introduction drum located above the discharge end of said shakers before said threshing and separating device, said introduction drum being associated with said transferring element.

* * * * *